US007884851B2

(12) United States Patent
Heymann

(10) Patent No.: US 7,884,851 B2
(45) Date of Patent: Feb. 8, 2011

(54) AUDIO AND VISUAL SYSTEM AND METHOD FOR PROVIDING AUDIO AND VISUAL INFORMATION USING SUCH SYSTEM

(75) Inventor: Matthias Heymann, Brooklyn, NY (US)

(73) Assignee: New York University, New York, NY (US)

( * ) Notice: Subject to any disclaimer, the term of this patent is extended or adjusted under 35 U.S.C. 154(b) by 1846 days.

(21) Appl. No.: 10/954,063

(22) Filed: Sep. 29, 2004

(65) Prior Publication Data

US 2006/0066732 A1    Mar. 30, 2006

(51) Int. Cl.
H04N 5/225 (2006.01)
(52) U.S. Cl. .................................. 348/207.99
(58) Field of Classification Search ............ 348/207.99, 348/231, 371, 207.11, 231.99–231.4, 222.1; 369/30; 382/112, 100; 396/283; 725/105; 707/104.1
See application file for complete search history.

(56) References Cited

U.S. PATENT DOCUMENTS

| 4,072,973 | A |   | 2/1978 | Mayo |       |
|-----------|---|---|--------|------|-------|
| 4,322,146 | A |   | 3/1982 | Shimizu et al. | |
| 4,334,754 | A |   | 6/1982 | Thompson | |
| 4,346,978 | A | * | 8/1982 | Taniguchi et al. | ........... 396/283 |
| 4,348,096 | A |   | 9/1982 | Katsuma et al. | |
| 4,502,771 | A |   | 3/1985 | Katsuma et al. | |
| 4,688,105 | A | * | 8/1987 | Bloch et al. | .................... 386/38 |
| 4,864,333 | A |   | 9/1989 | Barber | |
| 4,891,660 | A |   | 1/1990 | Biondo, Jr. | |
| 5,276,472 | A |   | 1/1994 | Bell et al. | |
| 5,531,645 | A |   | 7/1996 | Collins | |
| 5,552,850 | A |   | 9/1996 | Matsumoto | |
| 5,694,632 | A | * | 12/1997 | Capper | ....................... 396/431 |

(Continued)

FOREIGN PATENT DOCUMENTS

JP        54163027        12/1979

(Continued)

OTHER PUBLICATIONS

Sprint PCS Vision^SM Picture Phone, PM-8200, User's Guide.

(Continued)

*Primary Examiner*—Tuan Ho
(74) *Attorney, Agent, or Firm*—Dorsey & Whitney LLP

(57) ABSTRACT

Apparatus and methods of processing audio files used by the apparatus are provided. The apparatus includes a camera arrangement, a storage arrangement, and a user input arrangement. The storage arrangement can store one or more audio files. A user may prepare the camera arrangement to capture an image of a subject. A selected audio file arrangement can be played through a sound generation arrangement audible to the person whose image is being captured, in response to an activation of the user input arrangement of the apparatus. After the audio file is played, the camera apparatus captures the image. One exemplary embodiment includes a wireless device, and the audio files are downloaded from a vendor using a wireless network and a computer network. In addition or alternatively, a display arrangement can be provided that displays an interactive menu for selection of options related to the audio files. A two-step shutter control of the camera arrangement can be used as the input device for causing the audio file to play.

40 Claims, 7 Drawing Sheets

U.S. PATENT DOCUMENTS

| | | | | |
|---|---|---|---|---|
| 5,822,621 | A * | 10/1998 | Szajewski | 396/6 |
| 5,848,310 | A | 12/1998 | Baker | |
| 7,350,224 | B2 * | 3/2008 | Creamer et al. | 725/105 |
| 2003/0142216 | A1 * | 7/2003 | Jelinek | 348/207.99 |
| 2003/0174218 | A1 * | 9/2003 | Battles et al. | 348/231.4 |
| 2003/0189647 | A1 | 10/2003 | Kang | |
| 2004/0083302 | A1 * | 4/2004 | Thornton | 709/231 |
| 2004/0243817 | A1 * | 12/2004 | Hasegawa et al. | 713/193 |
| 2006/0062563 | A1 | 3/2006 | Yoon | |
| 2006/0147193 | A1 | 7/2006 | Yamamoto | |

FOREIGN PATENT DOCUMENTS

| | | |
|---|---|---|
| JP | 5680036 | 7/1981 |
| JP | 56080036 | 7/1981 |
| JP | 11046316 | 2/1999 |

OTHER PUBLICATIONS

Samsung Digital Cellular Telephone SPH-A800 User's Manual.

Sprint PCS® Service, Sprint PCS Vision$^{SM}$ Multimedia Phone, MM-A800 by Samsung®.

Minolta Dimage F300 Instruction Manual.

Canon, Powershot S500 Digital IXUS500, Powershot S410 Digital IXUS430, User Guide.

* cited by examiner

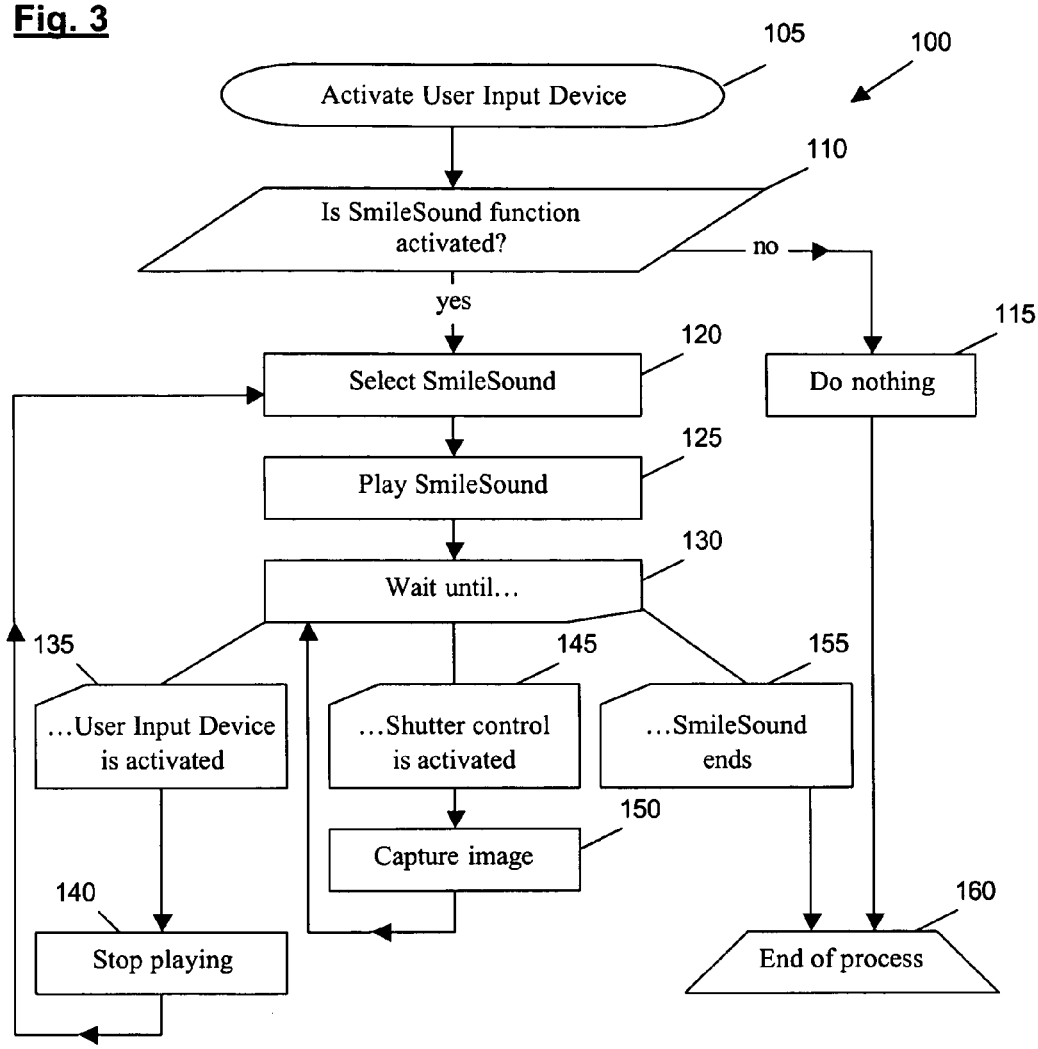

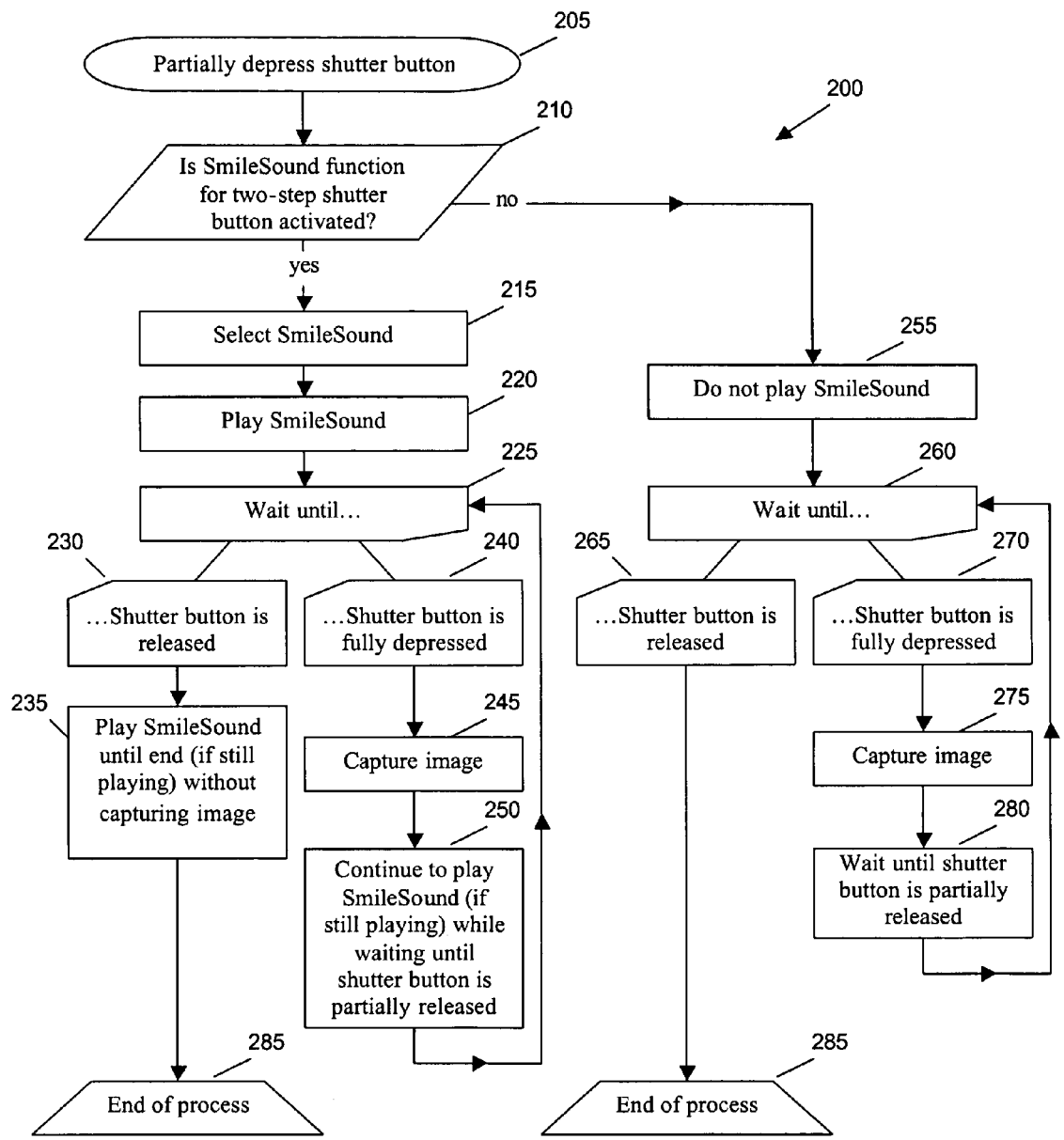

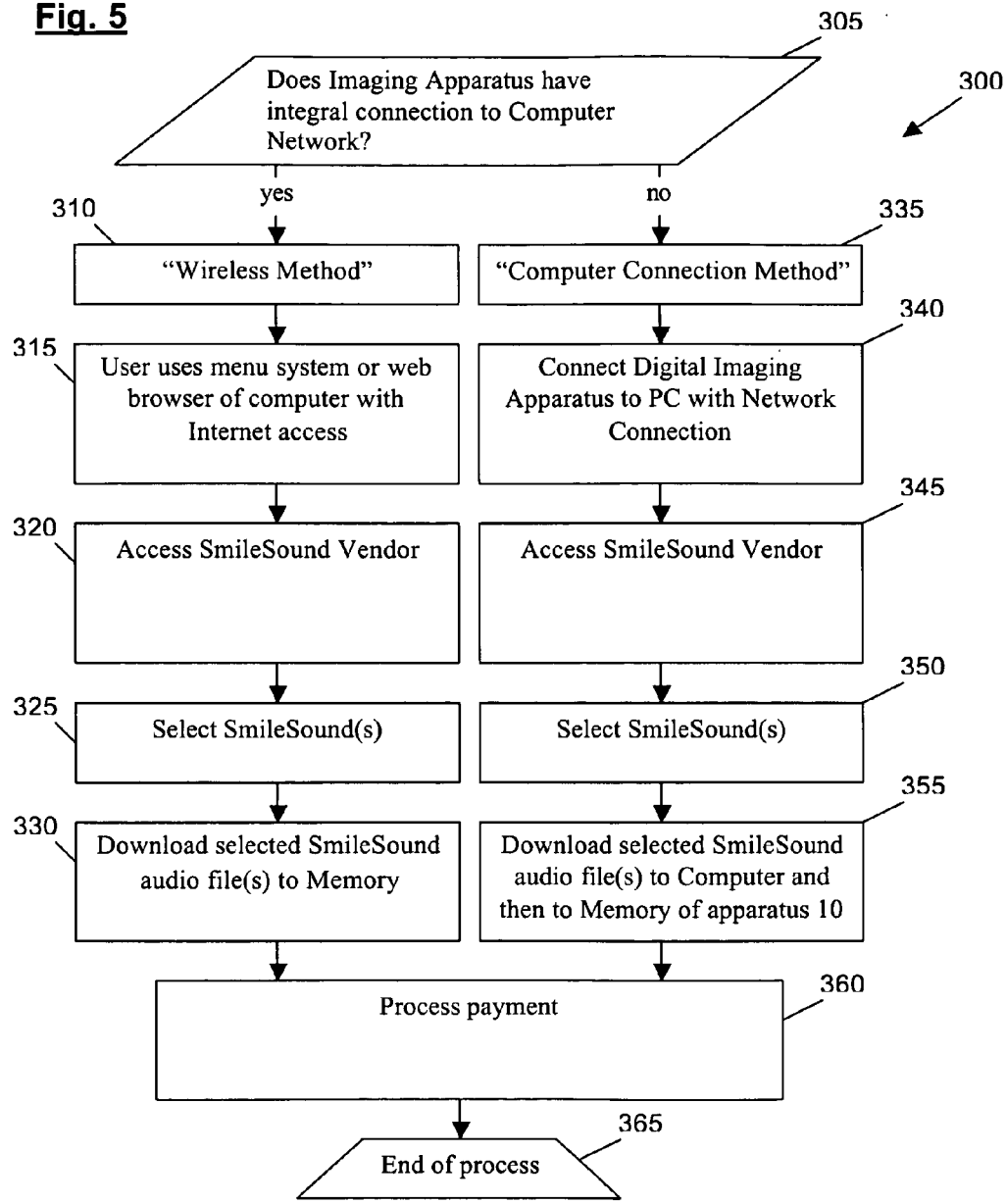

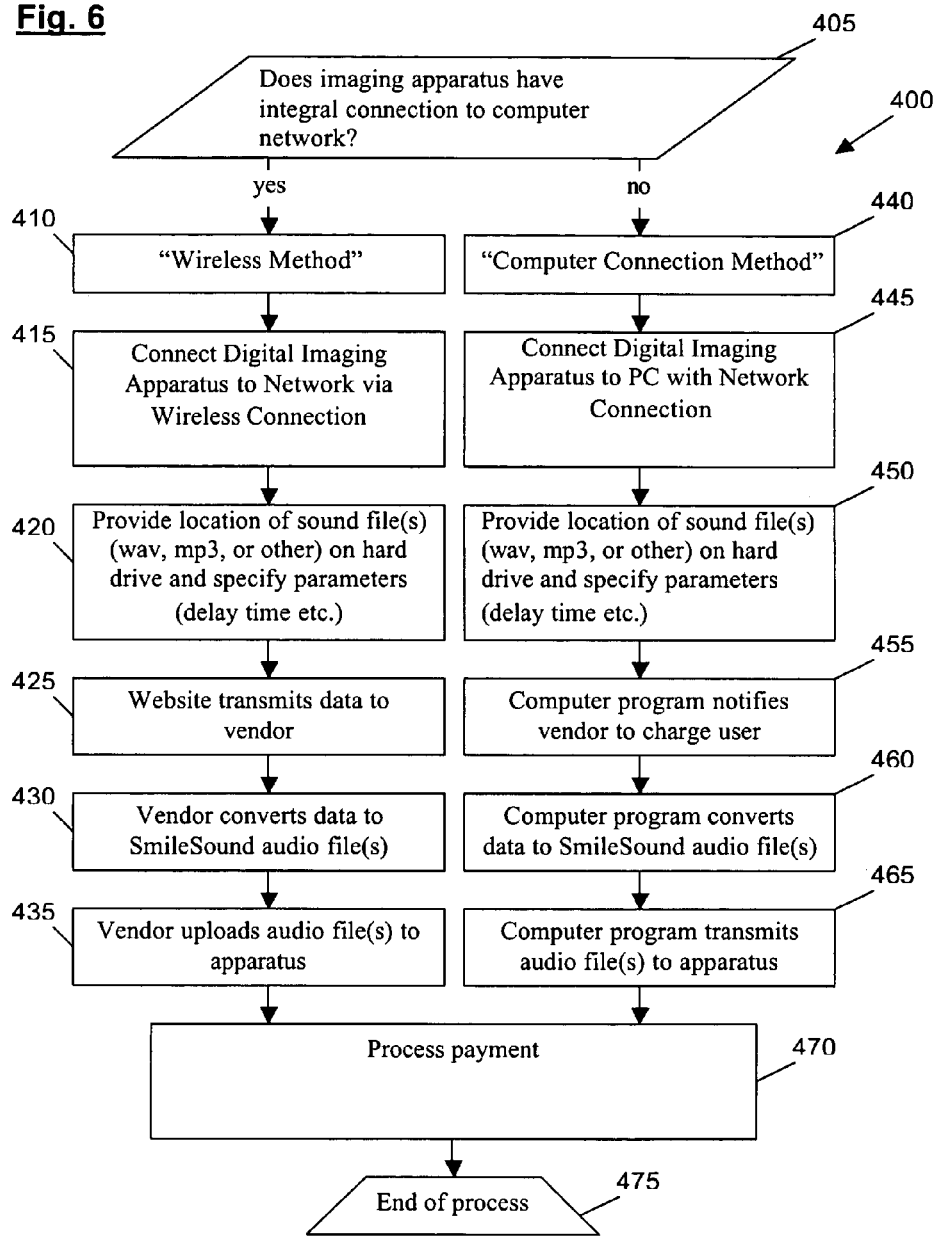

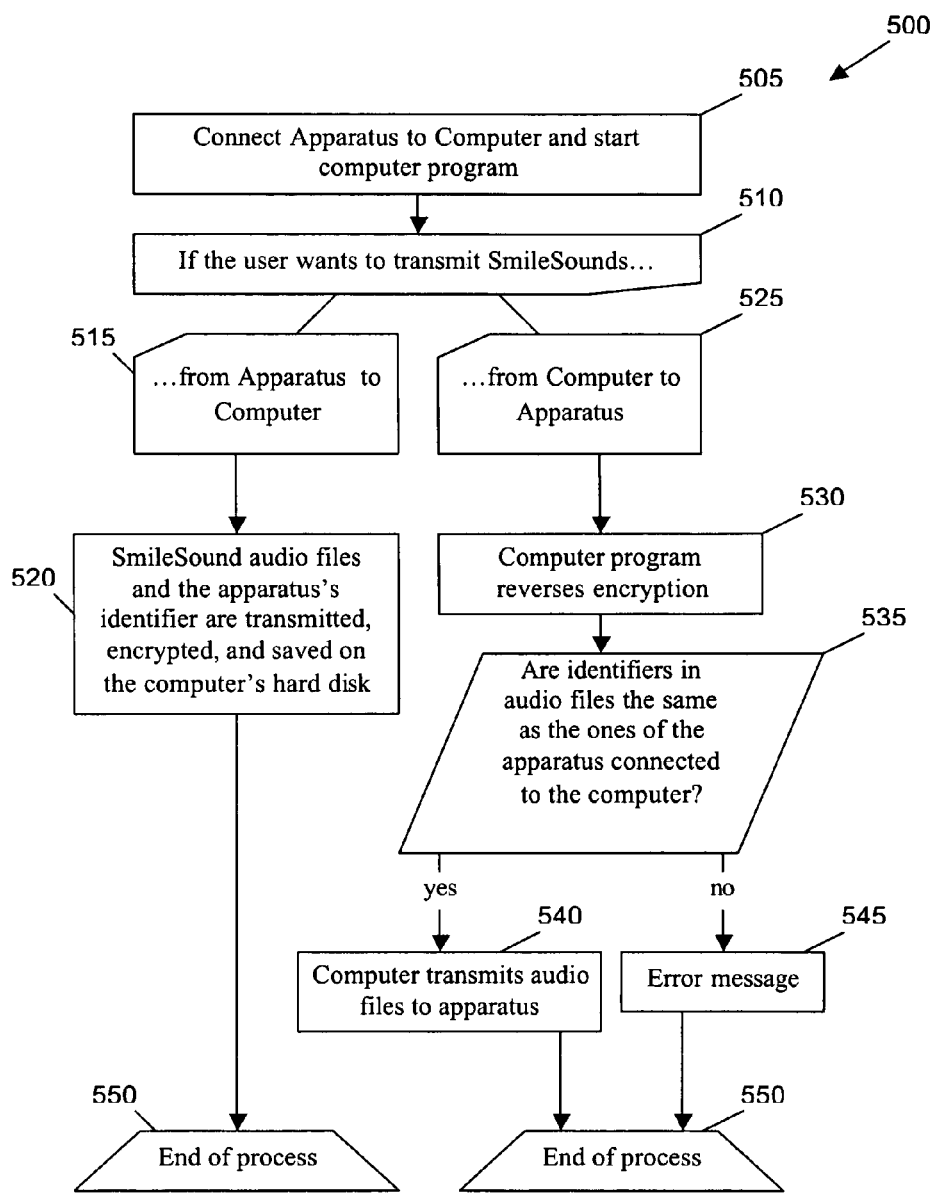

AUDIO AND VISUAL SYSTEM AND METHOD FOR PROVIDING AUDIO AND VISUAL INFORMATION USING SUCH SYSTEM

FIELD OF THE INVENTION

The present invention relates to a portable device that includes a camera that uses a sound to attract the attention of a subject before or during the time of taking the subject's photograph, and to a method and system for downloading one or more sounds to such portable device to be used when or before taking the subject's picture.

BACKGROUND INFORMATION

Since the invention of the camera, photographers have used various methods and devices to attract the attention of a person being photographed to produce a better photograph. One of the earliest and still most common methods, is for the photographer to utter the expression, "Say cheese," before operating the camera shutter. Over the years, photographers have used other methods and apparatuses for attracting the attention of the subject being photographed. Examples of such methods and apparatuses include (i) devices that are independent of the camera, such as flickering lights; (ii) devices that are attached peripherally to the camera, such as lights, speakers that play music or sounds; (iii) devices that conceal the camera in a stuffed animal or mask; and (iv) devices implemented in the camera itself, such as cameras that emit a single, pre-determined sound using a speaker in the camera, upon depression of the shutter control.

Conventional methods and systems for attracting attention of the subject being photographed have various shortcomings. Some may use sounds in connection with the camera that are inflexible, and allow the user to play only one pre-determined sound, and do not allow a selection and interchangeability of multiple sounds. Finally, they all lack the possibility of creating a profitable market by offering additional such sounds for sale.

SUMMARY

One exemplary embodiment of the present invention is an apparatus that has a storage arrangement that stores two or more audio files. The apparatus also includes a camera that captures an image of a subject, and stores the image in the storage arrangement. A user input device is in communication with the memory storage arrangement. Preferably, a sound generating arrangement emits a sound stored as an audio file in the storage arrangement in response to a signal from the user input device before the camera captures the image.

Another exemplary embodiment of the present invention is an apparatus (e.g., a cell phone, a PDA, etc.) which includes a wireless device that transmits and receives data via a wireless network and a storage arrangement, and which stores thereon a plurality of audio files downloaded to the storage arrangement via the wireless device. The apparatus further includes the user input device that causes one of the plurality of audio files to play, a sound generating arrangement that emits an audible sound associated with the audio file stored in the storage arrangement in response to activation of the user input device, and a camera that captures an image after the sound generating arrangement emits the sound.

Yet another exemplary embodiment of the present invention is an apparatus (e.g., a cell phone, a PDA, etc.), which includes means for storing a plurality of audio files, means for selecting one of the plurality of audio files, means for utilizing the selected audio file in response to a signal from the user input device, means for capturing an image after playing the sound, and means for storing the captured image.

Still another exemplary embodiment of the present invention provides a method for processing an audio file in an apparatus (e.g. a cell phone, PDA, etc.) having a camera and a user input device. For example, a signal is received from the user input device. A selected one of a plurality of audio files stored in a storage arrangement of the apparatus is played in response to the signal from the user input device. An image is captured using the camera after playing the selected audio file e.g., following a predetermined delay. The image is then stored in the storage arrangement.

A further exemplary embodiment of the present invention provides a method for processing audio files for use in connection with an apparatus (e.g., a cell phone, a PDA, etc.). A computer network is accessed via a wireless network, using a wireless device integral to the apparatus. Data related to an audio file is transmitted to an audio file vendor connected to the computer network, via the wireless network, to request an audio file. The audio file is received at the wireless device via the wireless network. The audio file is stored in a storage arrangement associated with the wireless device. A sound is emitted from a sound generating arrangement integral to the digital imaging apparatus using the audio file, in response to a control signal from a shutter control arrangement used to capture an image using a camera that is integral to (or connected to) the digital imaging apparatus.

A still further exemplary embodiment of the present invention provides a method for processing audio files for use in connection with an apparatus. A plurality of audio files is stored in a storage arrangement. Each of the audio files has associated therewith a sound portion and a delay portion. The audio files play on a digital imaging apparatus by emitting a sound stored in the sound portion, and causing a camera associated with or provided within the apparatus to capture an image after the delay portion specified in the audio file. The audio files are made available to a user of the apparatus via a computer network. A selection of one or more of the audio files is obtained from the user and the selected audio file is transmitted to the user via the computer network.

BRIEF DESCRIPTION OF THE DRAWINGS

The detailed description will refer to the following drawings, wherein like numerals refer to like elements, and wherein:

FIG. 3 is a flow chart of an exemplary embodiment of a method according to the present invention of using the apparatus of FIG. 1 or 2 having a separate shutter control arrangement for a camera and an audio generation device, such as a "SmileSound" user input device;

FIG. 4 is a flow chart of another exemplary embodiment of the method according to the present invention of using the apparatus of FIG. 1 or 2 in which the "SmileSound" feature is activated using the shutter control arrangement associated with the camera;

FIG. 5 is a flow chart of still another exemplary embodiment of the method according to the present invention for downloading "SmileSound" audio files from a third party's computer(s) that is/are accessible via a global computer network to the storage arrangement of the apparatus;

FIG. 6 is a flow chart of a further exemplary embodiment of the method according to the present invention for converting sound files on a computer into the "SmileSound" audio files for use by the apparatus; and FIG. 7 is a flow chart of yet another exemplary embodiment of the method according to the present invention for processing the "SmileSound" audio files.

DETAILED DESCRIPTION

Figure 1:
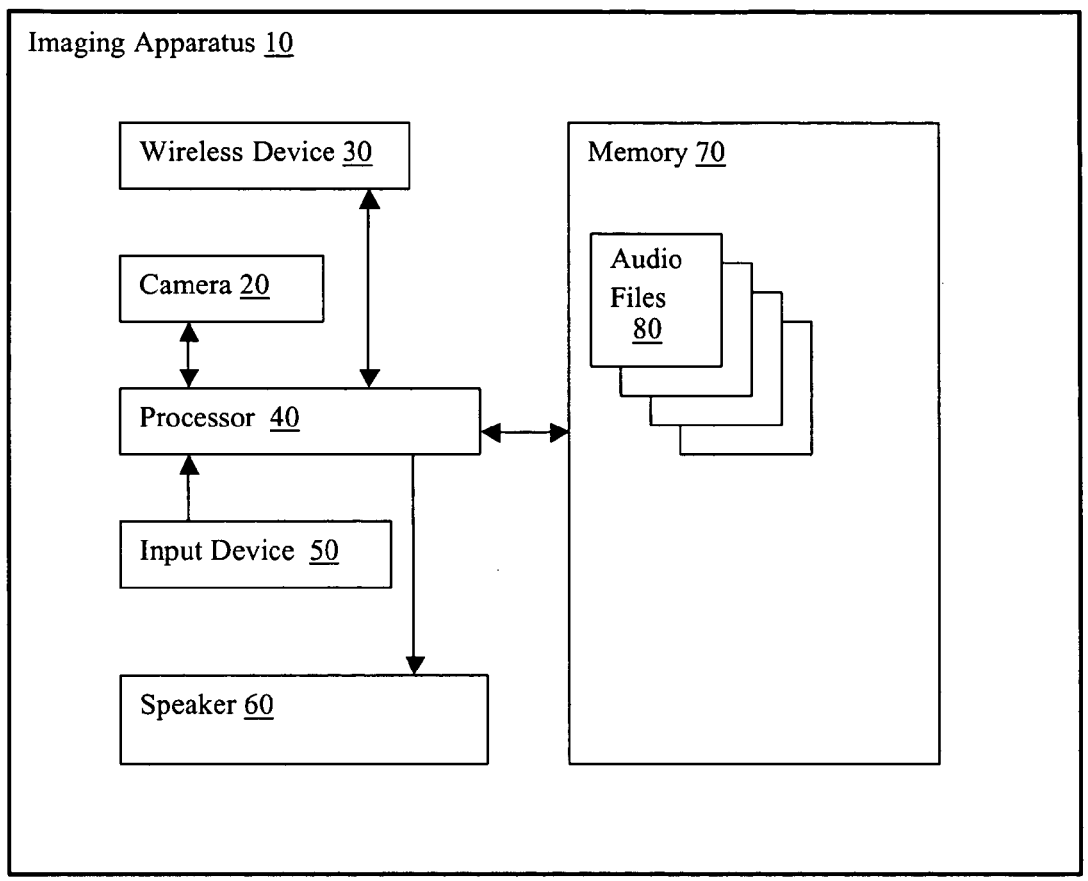
FIG. 1 is a block diagram of an exemplary embodiment of an apparatus according to the present invention having a wireless device, a camera, a processor, an input device, a speaker, and a storage arrangement.

FIG. 1 shows a block diagram of an exemplary embodiment of an apparatus 10 according to the present invention having a wireless device 30, a camera 20, a processor 40, an input device 50, a speaker 60, and a storage arrangement (e.g., memory 70, such as a hard disk, a memory card, RAM, ROM, a micro-CD-ROM, etc., or combinations thereof). The wireless device 30 includes a transmitter and a receiver that send and receive data, respectively, to and from a wireless network. A camera 20 captures images and stores images in the storage arrangement, such as the memory 70 shown in FIG. 1. One or more processors are capable of processing computer-executable instructions for allowing the camera 20 to capture images, processing data for the wireless device 30, and playing audio files 80 for "SmileSounds," described herein in further detail. As used herein, a "SmileSound" refers to any sound that may be used in connection with the apparatus 10 to gain the attention of a subject (e.g., a person) who is the object of an image to be captured by the apparatus 10. The "SmileSounds" may be stored in digital files referred to herein as "SmileSound audio files." Using the wireless device 30 and the camera 20, the apparatus 10 described above with reference to FIG. 1 includes the functionality of conventional devices commonly referred to as "camera-phones." Other exemplary embodiments of the apparatus 10 according to the present invention may include only the camera 20 without the wireless device 30.

For example, the memory 70 can store the SmileSound audio files 80. In one embodiment, the audio files 80 are interchangeable in that they can be replaced with different audio files 80. The processor 40 may access the memory 70, and processes the audio files 80 in response to signals received from the input device 50. The input device 50 may include multiple devices such as a "SmileSound control," a shutter control for the camera 20, a keypad for the wireless device 30, etc. In one exemplary embodiment, the apparatus 10 of the present invention also includes a display (not shown) that displays a menu system which can be used to select and process the "SmileSound" audio files.

In use, the user can select the audio file 80 from the memory 70 using the input device 50. The selected audio file 80 may be used by the processor 40 to generate a sound from the selected audio file 80, which is emitted from the speaker 60 at a volume loud enough for a subject who is an object of a photograph to hear (e.g., at up to approximately 5 meters away from the speaker 60). In one exemplary embodiment, the apparatus 10 can include a wireless device 30 that has the speaker 60 used to emit sounds related to the wireless device 30, such as ring tones, and this same speaker 60 may be used to play the SmileSounds described hereinabove. While the sound is being played, or thereafter, the apparatus 10 can capture an image using the camera 20. The image is stored in the storage arrangement, such as the memory 70 shown in FIG. 1.

The input device 50 may include a "SmileSound control" arrangement that controls the playing and/or execution of the SmileSound audio file 80. The input device 50 may also include a shutter control arrangement for the camera 20. The user can generate a SmileSound on the apparatus 10 in at least two ways, e.g., (a) by activating the separate SmileSound control and/or (b) by activating the shutter control arrangement that is configured to also play or generate the Smile-Sound. If the shutter control arrangement is used, the apparatus 10 can play or generate the SmileSound, and then capture the image after a certain delay time has passed. The delay time is the time between the beginning of the SmileSound and the capturing of the image. Different SmileSounds may have different delay times associated therewith. The delay times can be set as a parameter that is saved in the SmileSound audio file. In this way the SmileSound generator can make SmileSounds more effective by testing each of or selected sounds on subjects and measure optimal or desired delay times. By selecting the delay time shorter than the length of the actual sound, it is possible to capture the image before the SmileSound is finished playing, which may be desirable in certain instances.

Alternatively, the apparatus 10 may be implemented to use a two-step shutter control arrangement. When the shutter control arrangement is initially activated (for example, if the shutter control arrangement is a button, and the button is partially depressed), the camera 20 activates the generation of the SmileSound. When the shutter control arrangement is activated thereafter (for example, if the shutter control arrangement is a button, and the button is fully depressed), the camera 20 captures the image. This exemplary embodiment allows the user to circumvent the preset delay time associated with the SmileSound if the user prefers instead, for example, to directly control the delay time.

The SmileSound control may be used alone without the camera 20 capturing an image, for example, to allow the user to listen to one or more SmileSounds, and/or to select a desired SmileSound for use, or to play one or more Smile-Sounds before capturing the image. When the SmileSound control is activated, the apparatus 10 can generate a Smile-Sound without capturing the image. One exemplary embodiment provides a menu from which the user can select a feature that can disable the SmileSound control arrangement.

One further exemplary embodiment of the apparatus 10 includes a menu displayed on a display (not shown). The menu allows for a selection of various options for use with the SmileSounds. In one variant, those options include the following: (i) switching between modes to activate/deactivate the SmileSound feature, (ii) adjusting delay times for Smile-Sounds, (iii) adjusting use of SmileSounds in a self-timer mode of the apparatus 10, (iv) adjusting modes for selection of SmileSounds from a plurality of SmileSounds stored in the memory 70, and (v) adjusting download preferences for downloading the SmileSound audio files 80 into the memory 70 of the apparatus 10.

According to yet another exemplary embodiment, the menu allows the user to switch between the following three modes for activating/deactivating the SmileSound functions of the two buttons: (i) both the SmileSound control and the shutter control arrangement facilitate the generation of SmileSounds when activated, and the shutter control arrangement can cause the camera 20 to capture the image after the delay time has passed; (ii) only the SmileSound control causes SmileSounds to be generated, the shutter control arrangement only causes the camera 20 to capture the image; or (iii) none of the controls cause SmileSounds to be generated (for example, to avoid accidentally playing the Smile-Sound at a time when it is undesirable to make noise, such as during a concert or show). If a two-step shutter control is used, the user can also select between activating and deactivating the SmileSound function for partially-activating the shutter control arrangement.

Alternatively, the menu allows the user to select whether to use the preset delay times associated with SmileSound audio files, or to use a master delay time. The master delay time may be adjustable, and can apply the same delay to all Smile-Sounds generated by the apparatus 10, regardless of the delay times associated with the SmileSound audio files. In one example, SmileSound audio files may specify that the master delay time be used. Thus, producers and/or users of Smile-Sound audio files can determine whether to use the master delay time or a different delay time, for example, based on an optimal delay associated with a particular sound.

In one further exemplary embodiment, the menu allows the user to select whether to use the SmileSounds in a self-timer mode of the apparatus 10. In such case, the apparatus 10 may play SmileSounds of approximately 10 seconds in length from a special folder (e.g., this is a typical time between activating the shutter control and capturing the image in one exemplary embodiment of the self-timer mode). Of course, other examples are possible.

In still another exemplary embodiment, the menu allows the user to select between three modes for the selection of a the desired SmileSound(s) from a group of SmileSounds stored in the memory 70. These options allow the apparatus 10 to generate, e.g., (i) the same SmileSound (selected by the user) every time the SmileSound function is used unless the user selects a different SmileSound; (ii) a different Smile-Sound every time the SmileSound function is used, selected by the apparatus 10 from the entire collection of SmileSounds stored in the memory 70 or from a subset thereof, and/or played according to an order in which the SmileSounds appear in the memory 70; and (iii) a different SmileSound every time the SmileSound function is used, selected randomly by the apparatus 10 from the entire collection of the SmileSounds stored in the memory 70 or from a subset thereof.

According to yet another exemplary embodiment, the menu allows the user to select file operation functions to manage the SmileSound audio files 80 stored in the memory 70, for example, (i) by using subsets of audio files and arranging those subsets into folders or subfolders displayed on the display (for example, to sort files according to content), (ii) by moving SmileSounds between those subfolders, copying SmileSounds, or deleting SmileSounds, (iii) by converting SmileSounds to a lower sampling rate, or from 16-bit to 8-bit format in order to save memory, or (iv) by changing the delay time of a SmileSound. Additionally, these functions can be utilized using software in connection with a computer (not shown), such as a personal computer ("PC") connected to the apparatus 10 with a further user interface. In addition, according to one variant, some or all of these features may be available, e.g., only by connecting to a computer and using computer software, with only selected features available directly on the apparatus 10 independent of the computer. According to a further embodiment, the menu allows the user to select options for downloading the SmileSound audio files from the computer network (not shown) to the memory 70 of the apparatus 10, as described herein.

Further, a SmileSound audio file 80 can include at least two parts. The first part contains sound information for the Smile-Sound, and the second part contains parameters for the Smile-Sound. The sound information may be stored in various formats including, by way of example, a waveform (WAV)-compatible uncompressed format, a compressed format such as moving picture experts group audio level 3 (MP3), Windows media audio (WMA) or similar, and/or a musical instrument digital interface (MIDI)-like format (similar to formats used for polyphonic ring tones).

WAV-compatible formats are relatively simple to implement, flexible in their parameters (mono/stereo, bit-depth, sampling rate), and can store substantially every sound that composes the SmileSound audio files. In one example of WAV-compatible formatting, 15 SmileSound sound files with typical parameters (mono, 16-bit, 11,025 samples/sec) and 3 seconds in length may be stored in 1 MB of memory. In another exemplary embodiment, compressed formats can be used to allow the storage of more SmileSound audio files 80 in the memory 70. In still another implementation, formats similar to MIDI, which can be used for polyphonic ring tones, may be used.

Various parameters may be stored as data in the second part of the audio file according to this exemplary embodiment. Such parameters may include: (i) the length of the delay time; and (ii) a flag that indicates whether or not the SmileSound can be used in the self-timer mode of the apparatus.

Figure 2:
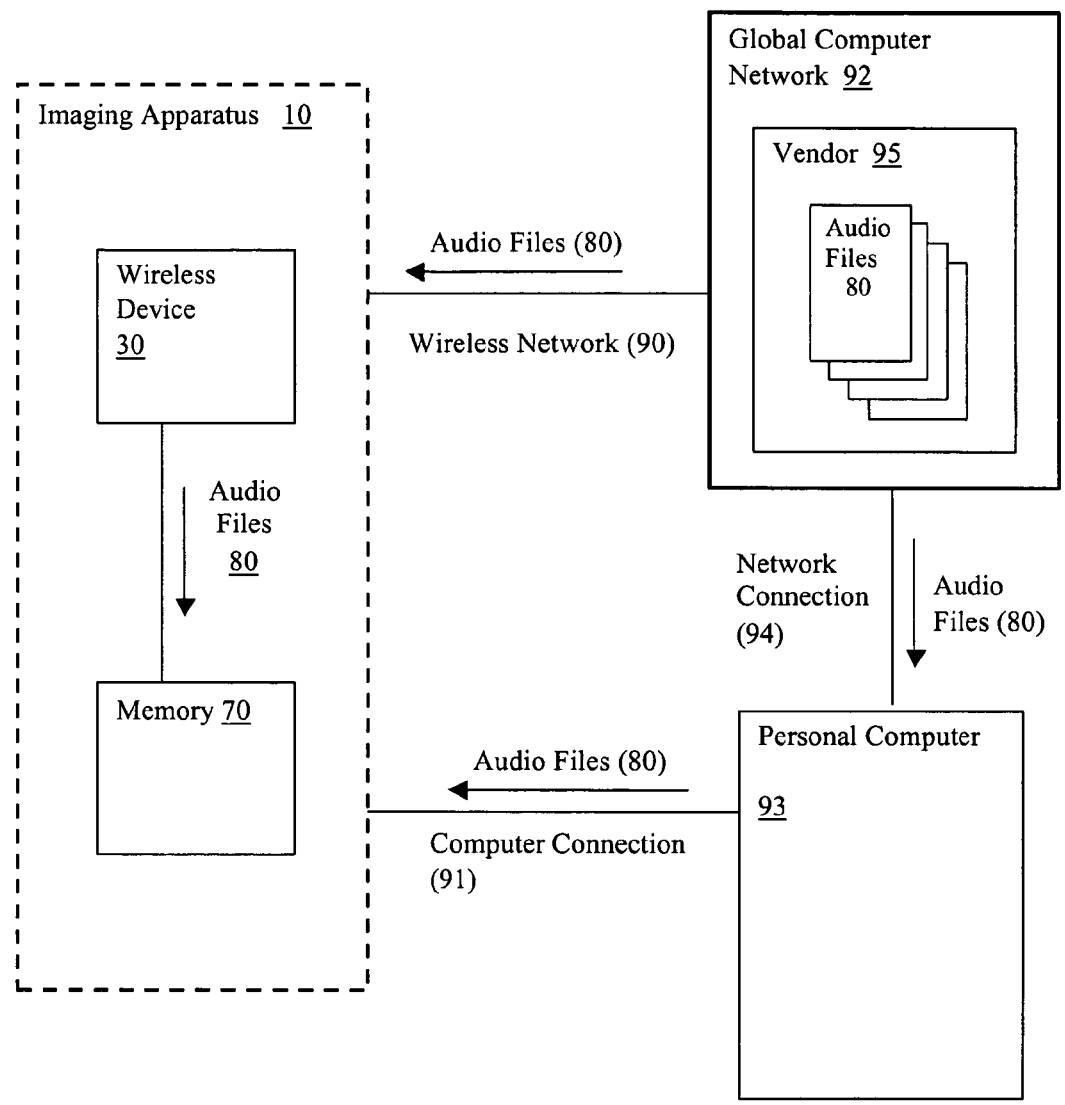
FIG. 2 is a block diagram of an exemplary embodiment of a system according to the present invention for downloading the audio files from a vendor to the storage arrangement of the apparatus including various ways of downloading the audio files.

FIG. 2 shows a block diagram of a system for downloading the audio files from a third party computing arrangement e.g., a vendor 95 to the memory 70 of the apparatus 10 including two different ways of downloading the audio files 80. The vendor 95 can be accessed via a global computer network 92, such as the Internet. The vendor 95 may have a plurality of audio files 80 available for download. In the exemplary embodiment shown in FIG. 2, the apparatus 10 includes a wireless device 30 that provides access to the vendor's website on the global computer network 92, via the wireless network 90 used by the wireless device 30 to transmit and receive data. The audio files 80 downloaded from the vendor 95 may be stored in the memory 70 of the apparatus 10. Alternatively, the audio files 80 may be downloaded using a computer such as a personal computer 93. The personal computer 93 includes a network connection arrangement 94 that provides access to the global computer network 92 and thus to the vendor's computer arrangement connected thereto. The apparatus 10 can connect to the computer 93 in any conventional manner via a computer connection 91, including a hard-wired connection with a cable or docking port, a wireless connection such as an infrared or radio frequency ("RF") connection, and/or a local area network. The audio files 80 are downloaded from the vendor 95 to the computer 93, and then transmitted to the apparatus 10 where the audio files 80 are stored in the memory 70.

In one embodiment, the SmileSound audio files 80 are downloaded from the vendor 95 and played in real time, and the audio files 80 are not stored in the memory 70 after capturing the image. In one embodiment, the apparatus 10 may be provided to the user with numerous pre-packaged audio files 80 stored in memory 70, but each audio file 80 may require a key code, obtainable from the vendor 95, to access and use the audio files 80 stored in the memory 70.

FIG. 3 shows a flow chart of one exemplary embodiment of a method 100 according to the present invention for using the apparatus 10 having the separate shutter control arrangement for the camera 20 and a "SmileSound" user input device. In step 105, the user activates a user input device of the apparatus 10, for example, by depressing a "SmileSound" button in one exemplary embodiment. The exemplary method 100 of FIG. 3 includes an ability for a selective activation and deactivation of the SmileSound feature. The apparatus 10 determines whether the SmileSound function is activated in step 110. If the function is not activated ("no" branch at block 110), then the apparatus 10 does nothing in step 115, and the method 100 stops in step 160. If the SmileSound feature is activated (i.e., the "yes" branch at block 110), then a SmileSound is selected in step 120. The SmileSound is played in step 125 by emitting sound from a speaker 60 connected to the digital imaging apparatus 10.

The exemplary method 100 of FIG. 3 includes three options for processing the SmileSound. The apparatus 10 waits in step 130 until either (a) the user input device 50, such as a SmileSound control, is activated again in step 135; (b) the shutter control for the camera 20 is activated in step 145; and/or (c) the SmileSound finishes playing in step 155. If nothing is done and the SmileSound finishes playing in step 155, then the method 100 is completed in step 160. The exemplary method 100 of FIG. 3 allows the user to listen to various SmileSounds without capturing the image. If the user input device 50 is activated in step 135 while the SmileSound is being played, the SmileSound stops playing in step 140, and another SmileSound may be selected and played in steps 120 and 125. In one exemplary embodiment, the same user input device (e.g., a SmileSound button) may be used both to start and stop playing the SmileSound. If the shutter control arrangement is activated while the SmileSound is playing or being generated, then the apparatus can capture the image in step 150 and the exemplary method 100 returns to block 130.

FIG. 4 shows a flow chart of another exemplary embodiment of a method 200 according to the present invention for using the apparatus 10, in which the SmileSound feature is activated using the shutter control arrangement for the camera 20. In one example, the shutter control arrangement is a button, and the user partially depresses the shutter control button in step 205 to begin. The apparatus 10 determines in step 210 whether the SmileSound function is activated for a two-step shutter control. If the SmileSound function is activated for a two-step shutter control (i.e., "yes" at block 210), then a SmileSound is selected in step 215 to be played, and the apparatus 10 plays the SmileSound in step 220. The apparatus 10 waits in step 225 until the shutter control arrangement is released or is fully depressed. If the shutter control is released in step 230, then the SmileSound plays to completion in step 235 if it is still playing or being generated, but no image is captured by the camera 20, and the exemplary method 200 then ends in step 285. If the shutter control arrangement is fully depressed in step 240, then the apparatus 10 captures the image in step 245. The SmileSound continues to play in step 250 if it is still playing or being generated until the shutter control arrangement is partially released. The exemplary method 200 then returns to block 225 in this exemplary embodiment.

If the SmileSound function is not activated (i.e., "no" branch at block 210), then no SmileSound is played in step 255 and the apparatus 10 waits in step 260 until the shutter control is released in step 265 or is fully depressed in step 270. If the shutter control arrangement is released in step 265, then the exemplary method 200 ends in step 285. If the shutter control arrangement is fully depressed in step 270, then the camera 20 captures the image in step 275, and waits in step 280 until the shutter control arrangement is partially released. The exemplary method 200 then returns to block 260.

FIG. 5 shows a flow chart of still another exemplary embodiment of a method 300 according to the present invention for downloading the SmileSound audio files 80 from the vendor 95 accessible via the global computer network 92 to the memory 70 of the apparatus 10. Different procedures can be used in this exemplary embodiment, depending upon whether the apparatus 10 has a direct connection to the computer network 92, such as the global computer network (e.g., the Internet). In one variant, the apparatus 10 has the wireless device 30 integral thereto that sends and receives data via the wireless network 90, and has capabilities for accessing the global computer network 92. If the apparatus 10 has a direct computer network connection (i.e., "yes" branch at block 305), then the "Wireless Method" in step 310 can be used, similar to conventional methods for downloading wireless telephone ring tones. In step 315, the user uses a menu of the apparatus 10 or a network browser of the personal computer 93 to access the computer network 92. Using the computer network 92, the user accesses SmileSound vendor 95 in step 320, and selects one or more SmileSound audio files 80 for download from the vendor 95 to the digital imaging apparatus 10 in step 325. The selected audio files 80 are then downloaded in step 330 into the memory 70 of the apparatus 10. In the example of FIG. 5, the user can purchase the SmileSounds from the vendor 95, and the payment transaction may be processed in step 360, for example, by charging the transaction to the user's credit card or account, and the exemplary method 300 ends at block 365.

If the apparatus 10 does not have a connection to the computer network 92 (i.e., "no" branch at block 305), then audio files 80 may be downloaded to the apparatus 10 using the computer 93, such as a PC, as provided in step 335 referred to as the "Computer Connection Method." In step 340, the apparatus 10 is connected to the PC having the network connection 94 to the computer network 92. In step 345, the computer 93 accesses the vendor 95 of the SmileSounds via the computer network 92, using software such as an Internet browser. The user then selects one or more SmileSounds in step 350 for download from the vendor 95. The audio file(s) 80 for the selected SmileSound(s) is/are downloaded in step 355 to the computer 93, which in turn transmits the audio files to the memory 70 of the apparatus 10. Payment for the SmileSound audio files is then processed in step 360, and the exemplary method 300 ends at block 365.

In the example of the "Wireless Method" that allows accessing the vendor 95 through the wireless device 30 of the apparatus 10, the payment processing method provided as step 360 can be the same process that is used for processing payment for the ring tones purchased for the apparatus 10. For example, the user can be charged on a monthly phone bill, a separate bill, or directly on a credit card. In the example of the "Computer Connection Method" provided in step 335 in which the apparatus 10 connects to the computer 93 that uses the network connection 94 to access the vendor 95 on the computer network 92, any payment method utilized for Internet shopping can be used.

FIG. 6 shows a flow chart of a further exemplary embodiment of a method 400 according to the present invention for converting sound files on a computer 93 into the SmileSound audio files 80 for use by an apparatus 10. In step 405, the user first determines whether the imaging apparatus 10 has an integral connection to the computer network 92 connected to the computer 93. If the apparatus 10 has a network connection (i.e., "yes" branch at block 405), then the "Wireless Method" in step 410 can be applied. The user can use a menu system displayed on the apparatus 10 to access a computer network via a wireless connection in step 415. In step 420, the user enters the location of the sound file on the storage arrangement of the PC, e.g., a hard drive, and can specify additional parameters, such as the delay time. A website transmits this data to the vendor 95 in step 425. The vendor 95 converts the data into a SmileSound audio file 80 in step 430. The vendor

95 then uploads the audio file 80 into the apparatus 10 in step 435, and processes payment from the user in step 470. Thereafter, the method 400 ends at block 475.

If the apparatus 10 does not have an integral connection to the computer network 92 (i.e., "no" branch at block 405), then the "Computer Connection Method" in step 440 may be used. The apparatus 10 is connected to the computer 93 having a network connection 94 in step 445. The user enters the location of the sound file on the PC's storage arrangement in step 450, and specifies additional parameters, such as delay time. A program executed by the computer 93 notifies the vendor 95 in step 455 to charge the user. The computer program converts in step 460 the sound file data into the SmileSound audio file 80, and transmits in step 465 the audio file 80 to the apparatus 10. The vendor 95 processes payment in step 470, and the method 400 ends at block 475.

One exemplary variant of the present invention uses at least two different ways that the apparatus 10 can extend its Smile-Sound collection. First, the user can convert any sound or sound file into the SmileSound audio file 80 using the computer 93, and upload the newly-created SmileSound to the apparatus 10, e.g., using a USB, infrared, radio frequency, or any other type of connection. Further, the computer 93 can include an operating system that automatically recognizes the apparatus 10 as an external hard drive so that the user can use a standard file browser (such as the Windows Explorer product currently manufactured by Microsoft Corporation) to transfer the SmileSound audio files 80 to the apparatus 10, and/or the computer 93 can execute software instructions to perform this function. Second, the user can download the SmileSound audio files 80 from the SmileSound vendor 95 for free or in exchange for payment. Both methods may be used to extend the SmileSound collection, in one implementation.

In one further exemplary embodiment, the apparatus 10 also includes a microphone (not shown) and software to allow the user to record his or her own SmileSound audio file 80 by speaking, singing, playing sounds, or otherwise emitting sound into the microphone, or by using an audio input connection or similar interface, recording the sound input, and storing the received sound into a SmileSound audio file 80 in the memory 70. In another exemplary variant, the user may create the SmileSound audio files 80 using the computer 93, such as the PC, and may upload these self-created Smile-Sound audio files 80 to the memory 70 of the apparatus 10 via the connection 91 between the computer 93 and the apparatus 10. In one example, a user using self-created audio files must still access a SmileSound vendor and get the vendor's permission (e.g., by paying a fee) before the self-created Smile-Sound may be used.

FIG. 7 shows a flow chart of still another exemplary embodiment of a method 500 according to the present invention for processing SmileSound audio files 80. In step 505, the apparatus 10 is connected to the computer 93 that has a computer program to transmit the audio files 80 to the apparatus 10. The exemplary embodiment shown in FIG. 7 provides for the transmission of the files 80 from the apparatus 10 to the computer 93, and vice-versa. If the audio files 80 are to be transmitted from the apparatus 10 to the computer 93 in step 515, then the SmileSound audio files 80 and an identifier for the apparatus 10 (such as a serial number of the apparatus 10) may be transmitted to the computer 93, encrypted, and saved on the computer's hard disk in step 520, and the process 500 ends at block 550. If the audio files 80 are to be transmitted from the computer 93 to the apparatus 10 in step 525, then the computer program reverses the encryption of the audio files 80 and the apparatus identifier in step 530. The apparatus 10 determines in step 535 whether the identifiers of the audio files 80 match the identifier associated with the apparatus 10 connected to the computer 93. If the identifiers match (i.e., "yes" branch at block 535), then the computer 93 transmits audio files 80 to the digital imaging apparatus 10 in step 540, and the method 500 ends in block 550. If the identifiers do not match (i.e., "no" branch at block 535), then an error message is generated in step 545, and the method 500 ends at block 550.

In order to enable the user to retain a SmileSound collection when acquiring a new apparatus 10 (e.g., with a new serial number), the imaging apparatus 10 in one exemplary embodiment provides a function to switch its identifier with any other apparatus 10 connected to it. In this way, the user can switch the identifier and SmileSound collection of the new apparatus with the ones of his/her old apparatus 10, and transfer his/her SmileSound collection from the computer 93 to the new apparatus 10. With the unique serial numbers, this exemplary procedure can ensure that the SmileSounds are used only in one device at a time.

Although the present invention has been described with respect to particular embodiments thereof, variations are possible. The present invention may be embodied in specific forms without departing from the essential spirit or attributes thereof. In addition, although aspects of an implementation consistent with the present invention are described as being stored in memory, one skilled in the art will appreciate that these aspects can also be stored on or read from other types storage arrangements. For example, computer program products or computer-readable media, such as secondary storage devices, including hard disks, floppy disks, or CD-ROM, a carrier wave from the Internet or any other network, or other forms of RAM or read-only memory (ROM) may be used. It is desired that the embodiments described herein be considered in all respects illustrative and not restrictive and that reference be made to the appended claims and their equivalents for determining the scope of the invention.

What is claimed is:

1. An apparatus comprising:
a first arrangement that is configured to store therein one or more audio files;
a second arrangement that is configured to obtain an image; and
a third arrangement that is configured to generate sound based on at least one of the audio files;
wherein at least one of the audio files includes sound information and one or more delay parameters which control a timing of obtaining the image by the second arrangement based on the generation of sound by the third arrangement, and wherein the second arrangement is configured to obtain the image at a particular time during the generation of the sound by the third arrangement based on the at least one of the audio files and the one or more delay parameters associated therewith.

2. The apparatus of claim 1, wherein the second arrangement is configured to forward the image for storage on the first arrangement.

3. The apparatus of claim 1, wherein the first arrangement is configured to store therein one or more audio files that are interchangeable with other audio files.

4. The apparatus of claim 1, wherein the first arrangement is configured to store therein one or more audio files that are downloadable from a separate source upon request.

5. The apparatus of claim 1, further comprising a fourth arrangement configured to control a shutter and in communication with the second arrangement, and wherein the third arrangement generates the sound for one of the audio files in response to an activation of the fourth arrangement.

6. The apparatus of claim 5, wherein the third arrangement generates the sound for the respective audio file in response to an activation of the fourth arrangement, and wherein the second arrangement is configured to obtain an image at a time based on the one or more delay parameters associated with the at least one audio file.

7. The apparatus of claim 1, wherein the third arrangement is configured to generate the sound for a randomly selected one of the audio files.

8. The apparatus of claim 1, wherein the third arrangement is configured to generate the sound for one of the audio files selected based on a sequence in which the audio files are stored in the first arrangement.

9. The apparatus of claim 1, further comprising a fifth arrangement that is configured to display a menu of selections associated with at least one audio file.

10. The apparatus of claim 1, further comprising a wireless sixth arrangement having a transmitter that is configured to send and a receiver that is configured to receive data via a wireless network.

11. The apparatus of claim 10, wherein at least one audio file is received by the first arrangement from an audio file vendor arrangement via the wireless network, using a wireless device.

12. The apparatus of claim 10, wherein the third arrangement is configured to generate a further sound for a ring tone used by a wireless device.

13. The apparatus of claim 1, wherein each of the audio files has associated therewith a controllable volume.

14. The apparatus of claim 1, further comprising:
a fourth arrangement configured for user input and in communication with the first arrangement, wherein the third arrangement is configured to generate sound based on at least one of the audio files in response to a signal from the fourth arrangement before the second arrangement obtains the image.

15. The apparatus of claim 14, wherein the fourth arrangement is a shutter control arrangement associated with the first arrangement, and wherein the third arrangement is configured to generate the sound for at least one audio file in response to an activation of the shutter control arrangement.

16. The apparatus of claim 15, wherein the shutter control arrangement is a button, wherein a partial depression of the button causes the third arrangement to generate the sound, and wherein a further depression of the button causes the second arrangement to capture the image.

17. The apparatus of claim 15, wherein activation of the shutter control arrangement causes the third arrangement to generate the sound, and wherein the second arrangement is configured to obtain the image at a time based on the one or more delay parameters associated with the at least one audio file.

18. The apparatus of claim 14, further comprising a seventh arrangement that is configured to record a sound in the first arrangement, and wherein the fourth arrangement comprises a parameter specification device that facilitates a specification of parameters for the recorded sound, and generates the audio file for the recorded sound using the recorded sound and the specified parameters.

19. The apparatus of claim 1, wherein the delay parameter provides for a delay time based on a start of the generation of the sound by the third arrangement.

20. An apparatus comprising:
a first arrangement configured to store therein a plurality of audio files;
a second arrangement configured to obtain at least one image; and
a third arrangement configured to generate at least one sound based on at least one of the audio files, wherein at least one delay parameter associated with each of the plurality of audio files is utilized to control a timing of obtaining the image based on the at least one sound being generated, and wherein the second arrangement is configured to obtain the at least one image at a particular time during the generation of the at least one sound by the third arrangement based on the at least one of the audio files and the at least one delay parameter associated therewith.

21. The apparatus of claim 20, wherein the at least one delay parameter provides for a delay time based on a start of the generation of the at least one sound by the third arrangement.

22. The apparatus of claim 20, wherein the at least one delay parameter associated with each audio file is included in the audio file.

23. The apparatus of claim 20, wherein each delay parameter associated with each of the plurality of audio files is capable of providing a different delay time before the second arrangement obtains the at least one image.

24. The apparatus of claim 20, wherein the first arrangement is configured to store therein one or more audio files that are downloadable from a separate source upon request.

25. The apparatus of claim 20, wherein at least one of the plurality of audio files is received by the first arrangement from an audio file vendor arrangement via a wireless network using a wireless device.

26. The apparatus of claim 20, wherein each of the plurality of audio files has associated therewith a controllable volume.

27. An apparatus comprising:
a first arrangement configured to store therein one or more audio files;
a second arrangement configured to obtain at least one image; and
a third arrangement configured to generate at least one sound based on the one or more audio files,
wherein at least one of the one or more audio files has associated therewith one or more delay parameters to control a timing of obtaining the at least one image, and
wherein the second arrangement is configured to obtain the image at a particular time during the generation of the at least one sound by the third arrangement based on the at least one of the one or more audio files and the one or more delay parameters associated therewith.

28. The apparatus of claim 27, wherein the one or more delay parameters associated with the at least one of the one or more audio files is included in the at least one of the one or more audio files.

29. The apparatus of claim 27, wherein the one or more delay parameters provide for a delay time based on a start of the generation of the at least one sound by the third arrangement.

30. The apparatus of claim 27, wherein the first arrangement is configured to store therein one or more audio files that are downloadable from a separate source upon request.

31. The apparatus of claim 27, wherein at least one of the one or more audio files is received by the first arrangement from an audio file vendor arrangement via a wireless network using a wireless device.

32. The apparatus of claim 27, wherein at least one of the one or more audio files has associated therewith a controllable volume.

33. A non-transitory computer-readable storage medium, having stored thereon computer-executable instructions that are executed by a processor, the computer-readable storage medium comprising:
 a hardware storage portion which is configured to store thereon one or more audio files,
 wherein at least one of the audio files includes sound information and one or more delay parameters which control a timing of obtaining at least one image by a first hardware arrangement based on a generation of at least one sound by a second hardware arrangement, and wherein the first hardware arrangement is configured to obtain the image at a particular time during the generation of the at least one sound by the second hardware arrangement based on the at least one of the audio files and the one or more delay parameters associated therewith.

34. The computer-readable storage medium of claim 33, wherein the one or more delay parameters provide for a delay time based on a start of the generation of the sound by the second hardware arrangement.

35. A non-transitory computer-readable storage medium, having stored thereon computer-executable instructions that are executed by a processor, the computer-readable storage medium comprising:
 a hardware storage portion which is configured to store thereon a plurality of audio files,
 wherein each of the plurality of audio files has a delay parameter associated therewith to control a timing of obtaining at least one image by a first hardware arrangement based on a generation of at least one sound by a second hardware arrangement, and wherein the first hardware arrangement is configured to obtain the image at a particular time during the generation of the at least one sound by the second hardware arrangement based on at least one of the plurality of audio files and the one or more delay parameters associated therewith.

36. The computer-readable storage medium of claim 35, wherein the delay parameter provides for a delay time based on a start of the generation of the at least one sound by the second hardware arrangement.

37. The computer-readable storage medium of claim 35, wherein the delay parameter associated with each of the plurality of audio files is included in the associated audio file.

38. A non-transitory computer-readable storage medium, having stored thereon computer-executable instructions that are executed by a processor, the computer-readable storage medium comprising:
 a hardware storage portion which is configured to store thereon one or more audio files,
 wherein at least one of the audio files has a delay parameter associated therewith which controls a timing of obtaining at least one image by a first hardware arrangement during the generation of sound by a second hardware arrangement.

39. The computer-readable storage medium of claim 38, wherein the one or more delay parameters provide for a delay time based on a start of the generation of the sound by the second hardware arrangement.

40. The computer-readable storage medium of claim 38, wherein the delay parameter associated with the at least one of the audio files is included in the at least one of the audio files.

* * * * *